Dec. 30, 1941.   S. D. KIGHTLINGER   2,267,927
AIRPLANE WING
Filed July 23, 1940   2 Sheets-Sheet 1
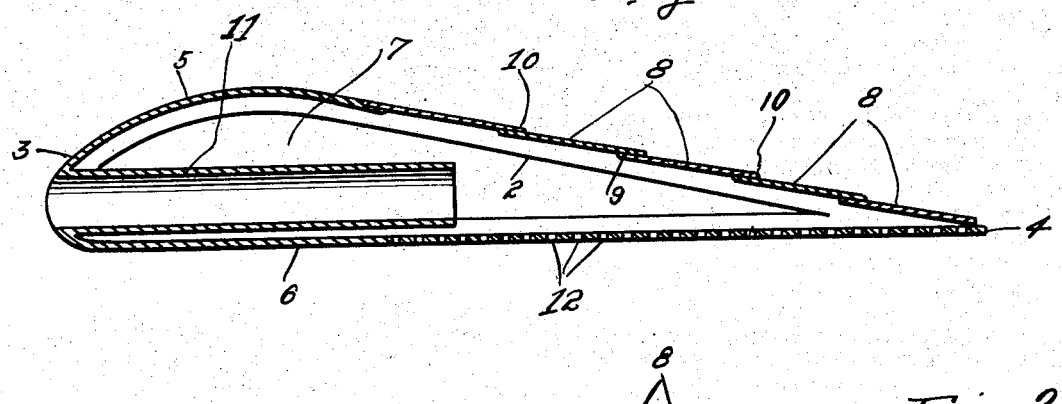
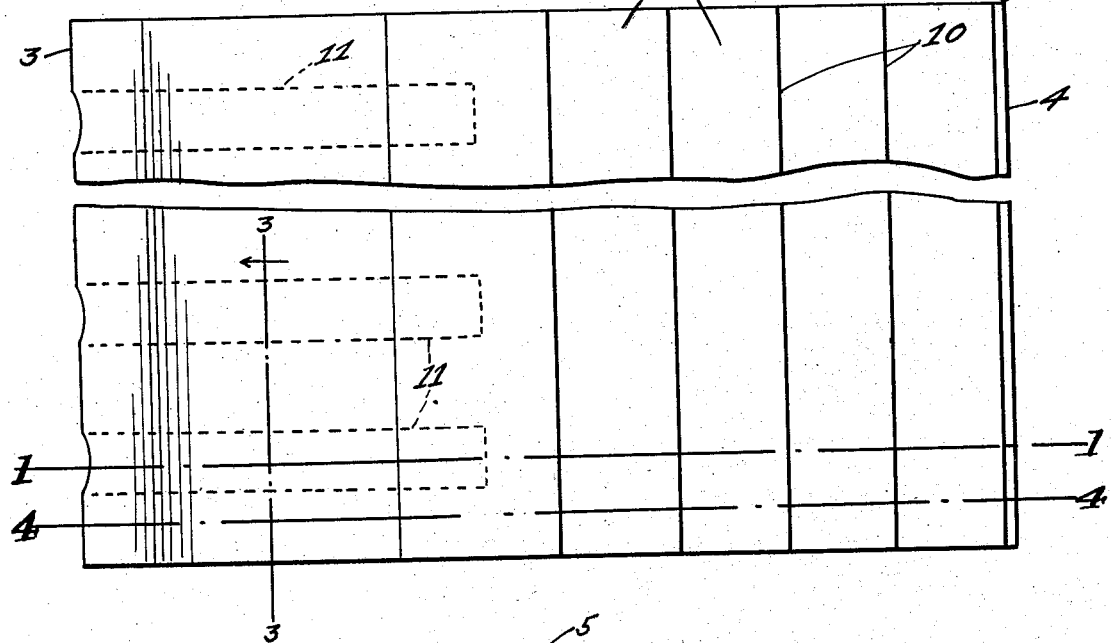
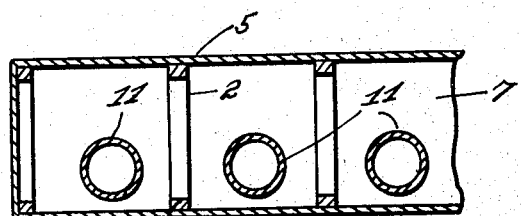
Inventor
Samuel D. Kightlinger
By Clarence A. O'Brien
Attorneys Dec. 30, 1941. S. D. KIGHTLINGER 2,267,927
AIRPLANE WING
Filed July 23, 1940 2 Sheets-Sheet 2

Inventor
Samuel D. Kightlinger
By Clarence A. O'Brien
Attorneys

Patented Dec. 30, 1941

2,267,927

UNITED STATES PATENT OFFICE 2,267,927

AIRPLANE WING

Samuel D. Kightlinger, Meadville, Pa.

Application July 23, 1940, Serial No. 347,055

4 Claims. (Cl. 244—40)

My invention relates to improvements in wings for airplanes and the principal object in view is to increase the efficiency of the wings of an airplane as regards lifting capacity, eliminating frontal and skin resistance, and by decreasing drag with resulting increase in speed.

Other and subordinate objects, together with the precise nature of my improvements, will be readily understood when the succeeding description and claims are read with reference to the drawings accompanying and forming part of this specification.

In said drawings:

Figure 1 is a view in transverse section of a preferred form of my invention,

Figure 2 is a fragmentary view in top plan partly broken away,

Figure 3 is a view in longitudinal section taken on the line 3—3 of Figure 2,

Figure 4:
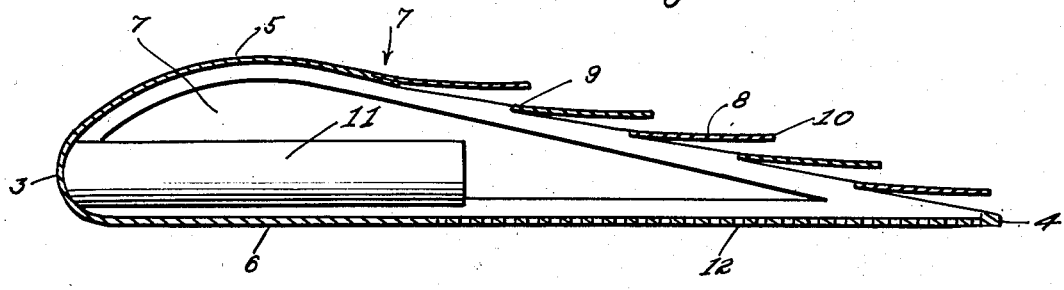
Figure 4 is a view in transverse section of the preferred form of the invention illustrating its operation.
Figure 5:
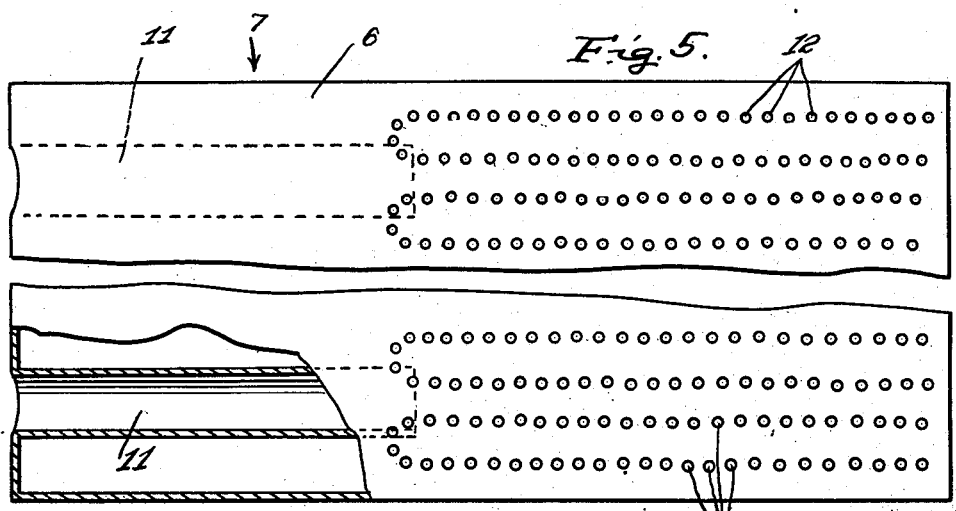
Figure 5 is a view in bottom plan partly broken away and shown in section.

Referring to the drawings by numerals, and first to Figures 1 to 5, according to the preferred form of my invention the wing 1 thereof is hollow with internal, frame-like ribs 2 of any suitable design, the usual design of leading and trailing edges, 3, 4, and top and bottom walls 5, 6, said wing by virtue of its hollow construction embodying a chamber 7 therein substantially coextensive in length and width with that of the wing. The top wall 5 has the usual camber.

The top 5 of the wing, for a suitable distance back of the leading edge 3 is of the usual construction but embodies a rear area of shingle-like flap sections 8 of spring metal, plaster composition or any other suitable material with front edges 9, or portions, secured to any desired fixed part of the wing 1, and rear edges 10 overlapping shingle fashion underlying sections 8. The sections 8 are of the proper construction to flex upwardly and thereby open the top of the wing under air pressure in the chamber 7 to permit such air to escape through the described sectional area. A series of tubular air inlet conduits 11 are provided in the chamber 7 to extend from the leading edge 3 of the wing 1 rearwardly into the chamber to approximately the center of the first section 8, said conduits being suitably spaced apart longitudinally of the wing 1 and extending substantially parallel with the bottom wall 6 thereof with the front ends thereof opening onto the leading edge 3. The bottom wall 4, beneath the area of sections 8 is perforated, for instance, as represented at 12. The sections 8 are constructed and arranged to flex upwardly into open position under air pressures on said wing varying in accordance with operating requirements and may be of any desired length, size or shape.

Referring now to the operation of the described form of the invention, the air forced into the chamber 7, under flight, forces the sections 8 upwardly into open position. The air thus let out of the wing 1 relieves the vacuum over the described sectional area and thereby reduces skin friction over the top of the wing and drag so as to increase speed. The open front ends of the conduits 11 reduce resistance to flight at the leading edge 3. The air escaping from the wing through the sectional area and breaking the vacuum over the rear portion of the wing exerts upward pressure against the sections 8 and thereby increases the lifting capacity of the wing. The spring of the sections under varying air pressures escaping past the same causes the wing to ride smoothly over air bumps and thereby further increase its efficiency. Some of the air pressure in the chamber 7 escapes through the perforations 12 in the bottom wall 6 and reduces skin friction and drag at the bottom of the wing.

Figures 6, 7:
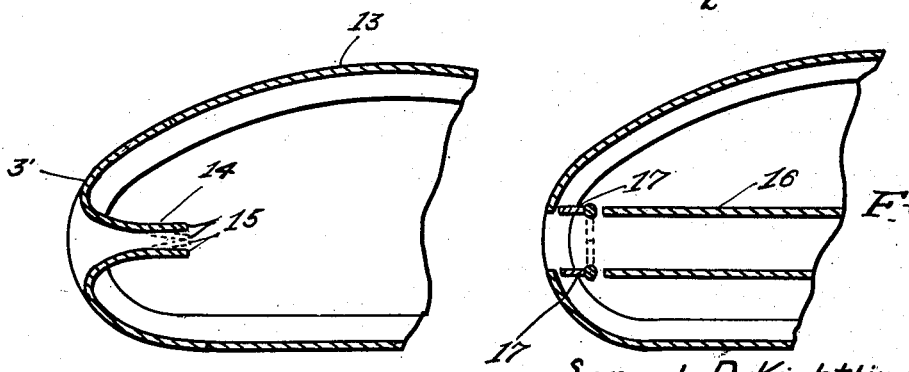
Figure 6 is a fragmentary view in transverse section of a modified form of my invention.
Figure 7 is a similar view of still another modification of the invention.

In the modified form of the invention shown in Figure 6, the leading edge 3' of the wing 13 is equipped with inturned air inlet nipples 14 having normally closed flexible inner ends 15, as indicated by dotted lines, adapted to open in varying degree under different air pressures created by flight at different speeds, said nipples being preferably arranged to close at low and open at high speeds and being utilized in lieu of the before mentioned conduits 11. Otherwise the construction is the same as that previously described.

In the modified form of the invention shown in Figure 7 the air conduits 16, corresponding to conduits 11, are provided with a pair of front shutter flaps 17 which may be operated to open and close the front ends of the conduits according to different operating requirements. Any suitable means may be utilized for opening and closing the flaps 17 at will, or automatically, if desired.

The foregoing will, it is believed, suffice to impart a clear understanding of my invention without further explanation.

Manifestly the invention, is susceptible of modification in other respects than as described without departing from the inventive concept, and right is herein reserved to such modifications as fall within the scope of the subjoined claims.

Having described the invention, what I claim is:

1. A hollow airplane wing including top and bottom walls and leading and trailing edges, the space in said wing forming an air pressure chamber therein, the leading edge of the wing being provided with air inlet apertures therein spaced along the same for admitting air into said chamber under flight, the rear portion of said top wall being provided with shingle-like flat flaps normally closed in overlapping relation and opening upwardly under the pressure of air in said chamber into upwardly and rearwardly inclined positions to discharge air from said chamber and function as propelling members under the action of such air discharging against the same, the discharged air breaking the vacuum over the rear portion of the wing to decrease skin friction over said portion and drag said bottom wall being perforated to provide bleed openings therein for the escape of air therethrough under pressure in said chamber and relieve skin friction against said bottom wall.

2. A hollow airplane wing including top and bottom walls and leading and trailing edges, the space in said wing forming an air pressure chamber therein, the leading edge of the wing being provided with air inlet apertures therein spaced along the same for admitting air into said chamber under flight, the rear portion of said top wall being provided with shingle-like flat flaps normally closed in overlapping relation and opening upwardly under the pressure of air in said chamber into upwardly and rearwardly inclined positions to discharge air from said chamber and function as propelling members under the action of such air discharging against the same, the discharged air breaking the vacuum over the rear portion of the wing to decrease skin friction over said portion and drag, said bottom wall being perforated to provide bleed openings therein for the escape of air therethrough under pressure in said chamber and relieve skin friction against said bottom wall, and tubular conduits extending from said air inlet apertures into said chamber for a short distance to direct air against said flaps.

3. A hollow airplane wing including top and bottom walls and leading and trailing edges, the space in said wing forming an air pressure chamber therein, the leading edge of the wing being provided with air inlet apertures therein spaced along the same for admitting air into said chamber under flight, the rear portion of said top wall being provided with shingle-like flat flaps normally closed in overlapping relation and opening upwardly under the pressure of air in said chamber into upwardly and rearwardly inclined positions to discharge air from said chamber and function as propelling members under the action of such air discharging against the same, the discharged air breaking the vacuum over the rear portion of the wing to decrease skin friction over said portion and drag, said bottom wall being perforated to provide bleed openings therein for the escape of air therethrough under pressure in said chamber and relieve skin friction against said bottom wall, and tubular conduits extending from said air inlet apertures into said chamber for a short distance to direct air against said flaps, said conduits having shutters in the front ends thereof for varying the admission of air thereinto.

4. A hollow airplane wing including top and bottom walls and leading and trailing edges, the space in said wing forming an air pressure chamber therein, the leading edge of the wing being provided with air inlet apertures therein spaced along the same for admitting air into said chamber under flight, the rear portion of said top wall being provided with shingle-like flat flaps normally closed in overlapping relation and opening upwardly under the pressure of air in said chamber into upwardly and rearwardly inclined positions to discharge air from said chamber and function as propelling members under the action of such air discharging against the same, the discharged air breaking the vacuum over the rear portion of the wing to decrease skin friction over said portion and drag, and a plurality of nipples extending from said air inlet apertures into said chamber and having flexible normally closed inner ends opening under air pressure in said nipples credited by flight of the wing.

SAMUEL D. KIGHTLINGER.